Aug. 4, 1931.  T. W. BEHAN  1,817,603
WRINGER
Filed Feb. 28, 1928   2 Sheets-Sheet 1
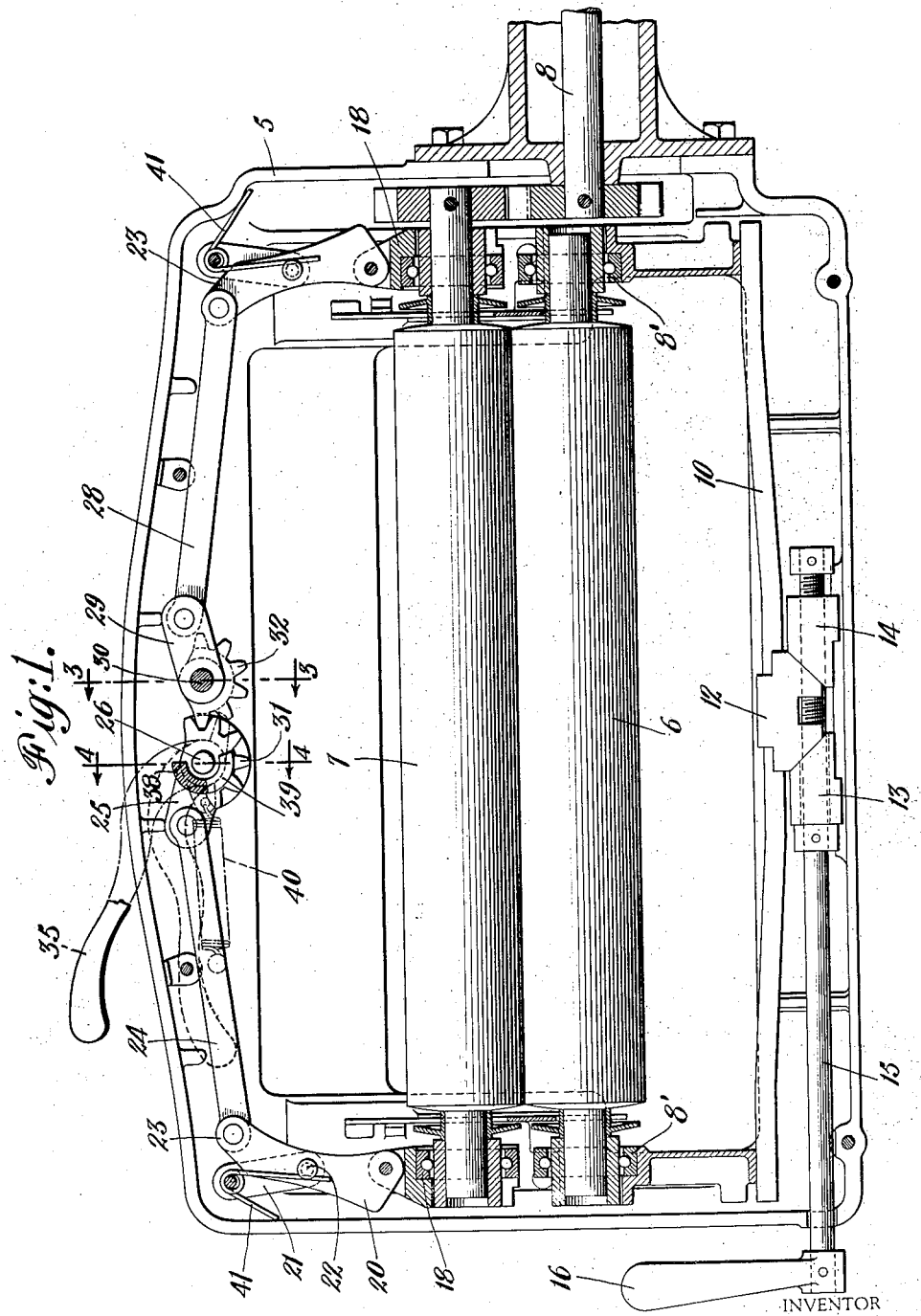
INVENTOR
THOMAS W BEHAN
BY
Morrell C. Clark
ATTORNEY

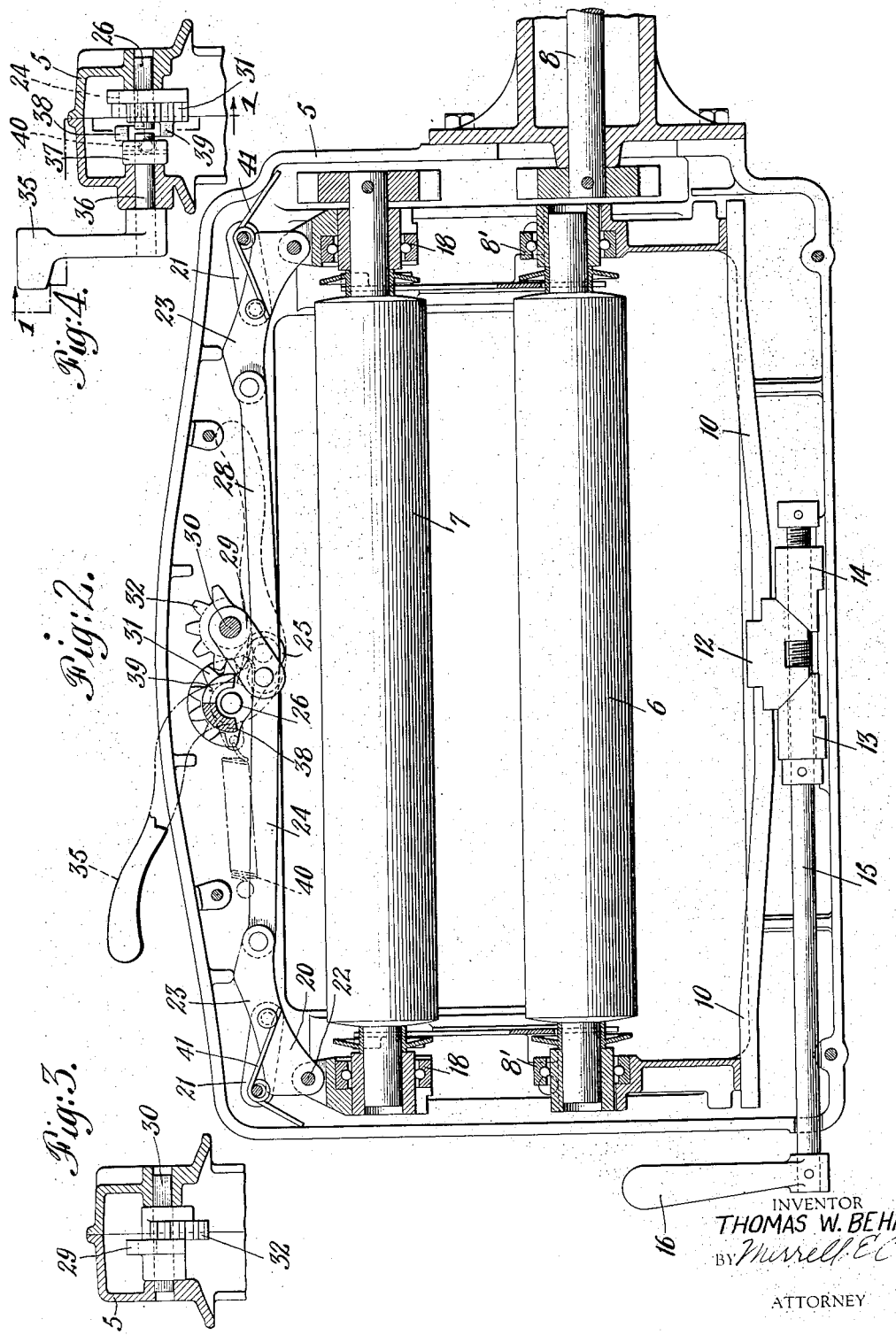

Patented Aug. 4, 1931

1,817,603

UNITED STATES PATENT OFFICE

THOMAS W. BEHAN, OF BINGHAMTON, NEW YORK, ASSIGNOR TO NINETEEN HUNDRED CORPORATION, A CORPORATION OF NEW YORK

WRINGER

Application filed February 28, 1928. Serial No. 257,664.

The present invention relates to laundry apparatus and has for an object to provide an improved wringer. The invention will be better understood from a description of a particular embodiment thereof for the purpose of which description reference should be had to the accompanying drawings forming a part hereof and in which—

Figure 1 is a view partly in section of a wringer constructed in accordance with the principles of the invention showing the rolls together in operative position, and Figure 2 is a similar view but showing the rolls in separated inoperative position.

Figures 3 and 4 are detail sectional views taken respectively on the lines 3—3 and 4—4 of Fig. 1.

The wringer shown for the purpose of illustration comprises a frame 5 carrying rolls 6, 7 arranged to be driven from a suitable power shaft 8. The lower roll 6 is carried in bearings 8' movable vertically in the frame and normally urged upwardly by a leaf spring 10. The tension of the spring 10 may be adjusted by means of the cooperating wedge members 12, 13 and 14, of which the member 12 is secured to the spring and the members 13 and 14 are carried by a shaft 15 which passes through enlarged bores in the wedge members 12 and 13 and is threaded into the wedge member 14 whereby when the shaft is rotated as by means of an arm 16 the relative movement of the wedges 13 and 14 will force the intermediate wedge member 12 upwardly to tension said spring 10.

The roll 7 is mounted in bearings 18 vertically movable in the sides of the frame 5, and the position of these bearings is controlled by means of toggle mechanism comprising toggle links 20, 21 pivoted to each other at 22 and pivoted at their ends respectively to the bearings 18 and to the frame 5. One end of each link 22 projects upwardly to provide an operating arm 23 which is actuated by a secondary toggle mechanism comprising on one side a toggle consisting of links 24, 25 pivoted to each other and respectively to the left hand arm 23 and a shaft 26 secured in the top of the frame and on the other side links 28 and 29 pivoted to each other and pivoted respectively to the free end of the right hand arm 23 and to the shaft 30 mounted in the top cross-bar of the frame 5. The links or arms 25 and 29 carry gears 31, 32 which intermesh to insure simultaneous operation of the two said toggle mechanisms controlling the position of the bearings in order that the two bearings may be moved simultaneously and in synchronism.

Arrangement is made for manual operation of the toggle mechanism. As shown a lever 35 is secured to a shaft 36 positioned in alignment with the shaft 26 and rotatably mounted in the frame. On the inner end of the shaft 36 is keyed a clutch member 37, which clutch member has an arcuate dog 38 arranged to engage a corresponding dog 39 on the segmental gear 31. A spring 40 secured to a lug in the clutch member 37 and to the frame tends normally to hold the clutch member 37 and, therefore, the lever 35 in the normal position shown in the drawings. The circumferential length of the dogs 38, 39 and the position of the same is such that when the roll 7 is in operative position, the dog 38 of the clutch member 37 will engage one side of the dog 39 in readiness for operation to break the toggles and raise the roll 7 but when the roll is in elevated inoperative position, as shown in Fig. 2, said dog 38 when in normal position will engage the opposite side of said dog 39 in readiness upon upward movement of the lever 35 to operate the toggle mechanism to force the roll 7 downwardly to operative position. By this arrangement the lever 35 has one normal position from which it may be moved downwardly to the dotted position shown in Figure 1 to separate the wringer rolls when they are together and from which it may be moved upwardly and over to the dotted position shown in Figure 2 to bring together the rolls when they are separated.

The arrangement shown is designed to facilitate emergency operation to separate the rolls. The lever 35 projects above the wringer frame in position to be struck to move it quickly downwardly which operation breaks all toggles and the roll will be lifted by the action of springs 41 provided for this purpose.

The frame is arranged to substantially enclose and form a casing for the toggle mechanism and the roll bearings. Conveniently the frame may be so constructed as to provide inwardly open channel top and side members which house the toggle mechanism and the bearings. The frame may be built up of separate parts and may comprise two similar shells meeting at the center and secured together.

The foregoing description of a particular embodiment is illustrative merely and is not intended as defining the limits of the invention.

I claim:—

1. A wringer comprising a frame, a pair of rolls, bearings slidable vertically in opposite sides of the frame and in which one roll is mounted, toggle links pivoted to the top of the frame and to each bearing for moving the same vertically, horizontal toggle mechanism connected to both sets of toggle links, and a lever for actuating said horizontal toggle mechanism.

2. A wringer, as defined in the preceding claim, having springs connected to the toggle links and tensioned normally to break the toggle links to lift the bearings.

3. A wringer comprising a frame, a pair of rolls, bearings slidable vertically in opposite sides of the frame and in which one roll is mounted, toggle links pivoted to the top of the frame and to each bearing for moving the same vertically, and horizontal toggle mechanism connected to both sets of toggle links comprising interengaging gear segments and a lever arranged to operate said segments.

4. A wringer comprising a frame having side and top members presenting inwardly open channel members, vertically movable bearings mounted in said frame, and a toggle mechanism which in any position is substantially completely enclosed within said channel members for operating said bearings vertically.

5. A wringer comprising a frame, a pair of rolls, bearings for one of said rolls slidable in opposite sides of the frame, toggle links extending between said bearings and fixed portions of said frame, said links when aligned serving to hold said rolls together, springs tensioned normally to break said toggle links and to lift the bearings, means for normally restraining said springs, and manual means for rendering said restraining means ineffective.

In testimony whereof, I have signed my name to this specification this 23rd day of February, 1928.

THOMAS W. BEHAN.